US012701452B2

(12) United States Patent
Eslitzbichler et al.

(10) Patent No.: US 12,701,452 B2
(45) Date of Patent: Aug. 4, 2026

(54) DYNAMICALLY SCALABLE SATELLITE COMMUNICATION NETWORK

(71) Applicant: Kratos Integral Holdings LLC, San Diego, CA (US)

(72) Inventors: Markus Eslitzbichler, Drammen (NO); Gregory Quiggle, Leesburg, VA (US); Stuart Daughtridge, Huntingtown, MD (US); Anthony Semiao, Purcellville, VA (US)

(73) Assignee: KRATOS INTEGRAL HOLDINGS LLC., San Diego, CA (US)

( * ) Notice: Subject to any disclaimer, the term of this patent is extended or adjusted under 35 U.S.C. 154(b) by 325 days.

(21) Appl. No.: 18/616,910

(22) Filed: Mar. 26, 2024

(65) Prior Publication Data

US 2025/0310818 A1 Oct. 2, 2025

(51) Int. Cl.
*H04W 28/02* (2009.01)
*H04B 7/185* (2006.01)
(Continued)

(52) U.S. Cl.
CPC .... *H04W 28/0215* (2013.01); *H04B 7/18513* (2013.01); *H04B 7/18517* (2013.01);
(Continued)

(58) Field of Classification Search
CPC .............. H04W 28/0215; H04W 84/06; H04B 7/18513; H04B 7/18517; H04L 41/0806; H04L 41/40
See application file for complete search history.

(56) References Cited

U.S. PATENT DOCUMENTS

2020/0028744 A1* 1/2020 Rice .................... H04L 41/0895
2020/0288516 A1* 9/2020 Elbaz ...................... H04L 41/40
(Continued)

FOREIGN PATENT DOCUMENTS

CN 114826377 A 7/2022
CN 116545500 A 8/2023

OTHER PUBLICATIONS

International Application No. PCT/US2025/018638, International Search Report and Written Opinion, Mailed On Jun. 23, 2025, 11 pages.
(Continued)

*Primary Examiner* — Michael A Keller
*Assistant Examiner* — Chhian (Amy) Ling
(74) *Attorney, Agent, or Firm* — Kilpatrick Townsend & Stockton LLP

(57) ABSTRACT
Described herein are systems, methods, and other techniques for scaling a satellite communication system. A gateway includes a compute infrastructure running a traffic adapter, a first virtual transmitter, and a first virtual receiver. The first virtual transmitter modulates signals for transmission to a first remote terminal. The first virtual receiver demodulates signals received from the first remote terminal. The traffic adapter transmits first outbound baseband frames to the first virtual transmitter and receives first inbound baseband frames from the first virtual receiver. A request is received to add a second remote terminal to the satellite communication system. A second virtual receiver is instantiated at the compute infrastructure to demodulate signals received from the second remote terminal. The traffic adapter is reconfigured to receive second inbound baseband frames from the second virtual receiver.

20 Claims, 8 Drawing Sheets

(51) Int. Cl.
　　　*H04L 41/0806*　　　(2022.01)
　　　*H04L 41/40*　　　(2022.01)
　　　*H04W 84/06*　　　(2009.01)

(52) U.S. Cl.
　　　CPC .......... *H04L 41/0806* (2013.01); *H04L 41/40*
　　　　　　　　(2022.05); *H04W 84/06* (2013.01)

(56)　　　　　　　References Cited

U.S. PATENT DOCUMENTS

2023/0123805 A1*　4/2023　Duyck .............. H04B 7/18517
　　　　　　　　　　　　　　　　　　　　　　370/316
2023/0361859 A1*　11/2023　Yu ..................... H04B 7/18513
2024/0236016 A1*　7/2024　Ghatpande ............. H04L 47/76

OTHER PUBLICATIONS

Satell et al., "Software Defined Satellite Cloud Ran", International Journal of Satellite Communications and Networking, vol. 00, Jan. 1, 2016, pp. 1-46.

* cited by examiner

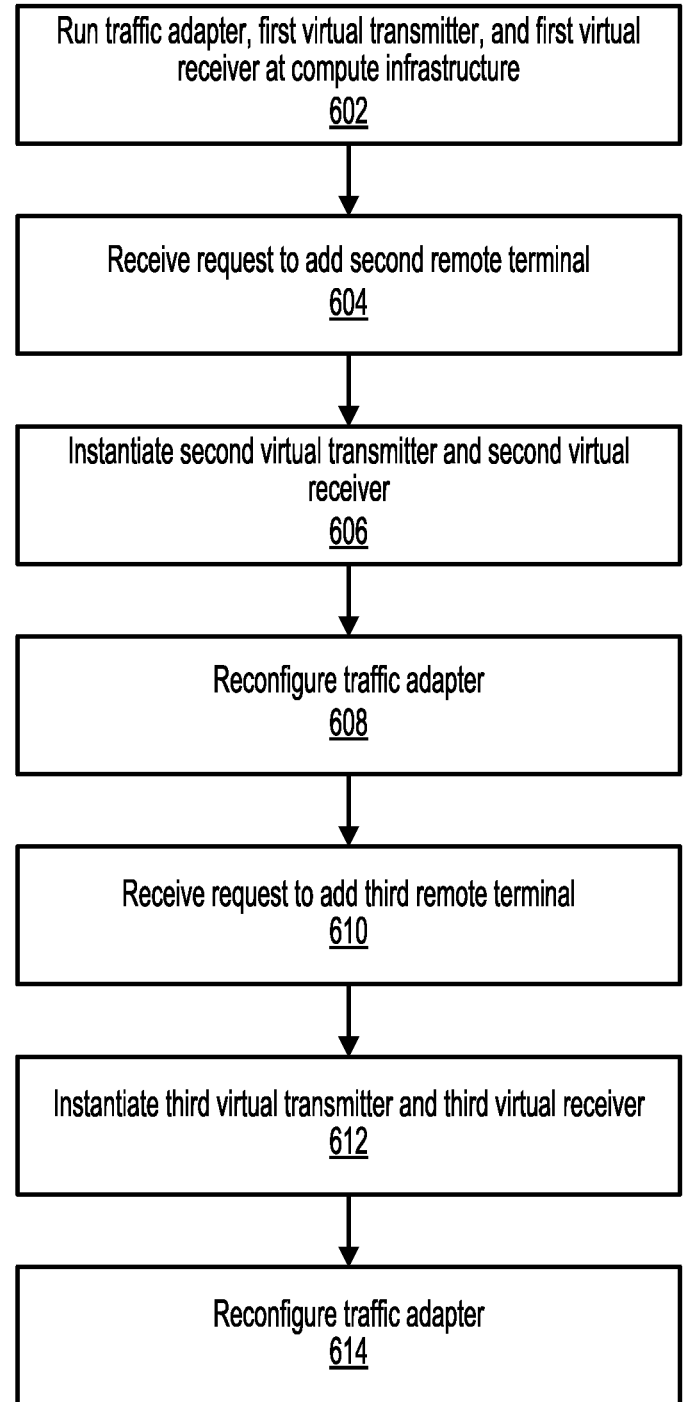

Run traffic adapter, first virtual transmitter, and first virtual receiver at compute infrastructure
602

Receive request to add second remote terminal
604

Instantiate second virtual transmitter and second virtual receiver
606

Reconfigure traffic adapter
608

Receive request to add third remote terminal
610

Instantiate third virtual transmitter and third virtual receiver
612

Reconfigure traffic adapter
614

600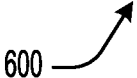

FIG. 6

DYNAMICALLY SCALABLE SATELLITE COMMUNICATION NETWORK

BACKGROUND OF THE INVENTION

Satellite communication systems play a crucial role in facilitating global connectivity across diverse applications, including telecommunications, broadcasting, internet services, and remote sensing. These systems operate by transmitting signals between ground-based Earth stations and satellites in orbit. The efficiency and reliability of such systems are important to addressing the increasing demands of contemporary communication and data services. Presently, communications engineers encounter numerous challenges, with a key concern being the optimization of information transmission over limited resources. Given the scarcity of available frequencies for radio signal communication and the rapid growth in the volume of information to be conveyed, there is a need to maximize the efficiency of available frequencies through the use of new hardware and software solutions at the ground stations, terminals, and satellites that make up such communication systems.

SUMMARY OF THE INVENTION

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a method of scaling a satellite communication system, the method comprising: running a traffic adapter, a first virtual transmitter, and a first virtual receiver at a compute infrastructure of a gateway, the first virtual transmitter configured to modulate signals based on first outbound baseband frames for transmission to a first remote terminal via a satellite, the first virtual receiver configured to demodulate signals received from the first remote terminal via the satellite to produce first inbound baseband frames, and the traffic adapter configured to transmit the first outbound baseband frames to the first virtual transmitter and receive the first inbound baseband frames from the first virtual receiver; receiving, at a management system, a request to add a second remote terminal to the satellite communication system; and responsive to receiving the request to add the second remote terminal: instantiating a second virtual receiver at the compute infrastructure, the second virtual receiver configured to demodulate signals received from the second remote terminal via the satellite to produce second inbound baseband frames; and reconfiguring the traffic adapter to receive the second inbound baseband frames from the second virtual receiver.

Example 2 is the method of example(s) 1, wherein the satellite communication system implements a first network type being one of a single channel per carrier (SCPC) network type, a frequency division multiple access (FDMA) network type, or a time division multiple access (TDMA) network type.

Example 3 is the method of example(s) 2, further comprising: receiving, at the management system, a request to switch to a second network type, the second network type being different than the first network type; and responsive to receiving the request to switch to a second network type: reconfiguring the traffic adapter, the first virtual transmitter, the first virtual receiver, and the second virtual receiver to implement the second network type.

Example 4 is the method of example(s) 2, wherein the first network type is the SCPC network type and the second network type is the FDMA network type or the TDMA network type, and wherein reconfiguring the traffic adapter to implement the second network type includes reconfiguring the traffic adapter to transmit the first outbound baseband frames and second outbound baseband frames to a same virtual transmitter.

Example 5 is the method of example(s) 1, further comprising: further responsive to receiving the request to add the second remote terminal: instantiating a second virtual transmitter at the compute infrastructure, the second virtual transmitter configured to modulate signals based on second outbound baseband frames for transmission to the second remote terminal via the satellite; and reconfiguring the traffic adapter to transmit the second outbound baseband frames to the second virtual transmitter.

Example 6 is the method of example(s) 5, further comprising: receiving, at the management system, a request to add a third remote terminal to the satellite communication system; and responsive to receiving the request to add the third remote terminal: instantiating a third virtual receiver at the compute infrastructure, the third virtual receiver configured to demodulate signals received from the third remote terminal via the satellite to produce third inbound baseband frames; and reconfiguring the traffic adapter to receive the third inbound baseband frames from the third virtual receiver.

Example 7 is the method of example(s) 6, further comprising: further responsive to receiving the request to add the third remote terminal: instantiating a third virtual transmitter at the compute infrastructure, the third virtual transmitter configured to modulate signals based on third outbound baseband frames for transmission to the third remote terminal via the satellite; and reconfiguring the traffic adapter to transmit the third outbound baseband frames to the third virtual transmitter.

Example 8 is the method of example(s) 7, further comprising: receiving, at the management system, a request to remove the third remote terminal from the satellite communication system; and responsive to receiving the request to remove the third remote terminal: terminating the third virtual receiver at the compute infrastructure; and reconfiguring the traffic adapter to not receive the third inbound baseband frames.

Example 9 is a non-transitory computer-readable medium comprising instructions that, when executed by one or more processors, cause the one or more processors to perform operations for scaling a satellite communication system, the operations comprising: running a traffic adapter, a first virtual transmitter, and a first virtual receiver at a compute infrastructure of a gateway, the first virtual transmitter configured to modulate signals based on first outbound baseband frames for transmission to a first remote terminal via a satellite, the first virtual receiver configured to demodulate signals received from the first remote terminal via the satellite to produce first inbound baseband frames, and the traffic adapter configured to transmit the first outbound baseband frames to the first virtual transmitter and receive the first inbound baseband frames from the first virtual receiver; receiving, at a management system, a request to add a second remote terminal to the satellite communication system; and responsive to receiving the request to add the second remote terminal: instantiating a second virtual receiver at the compute infrastructure, the second virtual receiver configured to demodulate signals received from the second remote terminal via the satellite to produce second inbound baseband frames; and reconfiguring the traffic adapter to receive the second inbound baseband frames from the second virtual receiver.

Example 10 is the non-transitory computer-readable medium of example(s) 9, wherein the satellite communication system implements a first network type being one of a single channel per carrier (SCPC) network type, a frequency division multiple access (FDMA) network type, or a time division multiple access (TDMA) network type.

Example 11 is the non-transitory computer-readable medium of example(s) 10, wherein the operations further comprise: receiving, at the management system, a request to switch to a second network type, the second network type being different than the first network type; and responsive to receiving the request to switch to a second network type: reconfiguring the traffic adapter, the first virtual transmitter, the first virtual receiver, and the second virtual receiver to implement the second network type.

Example 12 is the non-transitory computer-readable medium of example(s) 10, wherein the first network type is the SCPC network type and the second network type is the FDMA network type or the TDMA network type, and wherein reconfiguring the traffic adapter to implement the second network type includes reconfiguring the traffic adapter to transmit the first outbound baseband frames and second outbound baseband frames to a same virtual transmitter.

Example 13 is the non-transitory computer-readable medium of example(s) 9, wherein the operations further comprise: further responsive to receiving the request to add the second remote terminal: instantiating a second virtual transmitter at the compute infrastructure, the second virtual transmitter configured to modulate signals based on second outbound baseband frames for transmission to the second remote terminal via the satellite; and reconfiguring the traffic adapter to transmit the second outbound baseband frames to the second virtual transmitter.

Example 14 is the non-transitory computer-readable medium of example(s) 13, wherein the operations further comprise: receiving, at the management system, a request to add a third remote terminal to the satellite communication system; and responsive to receiving the request to add the third remote terminal: instantiating a third virtual receiver at the compute infrastructure, the third virtual receiver configured to demodulate signals received from the third remote terminal via the satellite to produce third inbound baseband frames; and reconfiguring the traffic adapter to receive the third inbound baseband frames from the third virtual receiver.

Example 15 is the non-transitory computer-readable medium of example(s) 14, wherein the operations further comprise: further responsive to receiving the request to add the third remote terminal: instantiating a third virtual transmitter at the compute infrastructure, the third virtual transmitter configured to modulate signals based on third outbound baseband frames for transmission to the third remote terminal via the satellite; and reconfiguring the traffic adapter to transmit the third outbound baseband frames to the third virtual transmitter.

Example 16 is the non-transitory computer-readable medium of example(s) 15, wherein the operations further comprise: receiving, at the management system, a request to remove the third remote terminal from the satellite communication system; and responsive to receiving the request to remove the third remote terminal: terminating the third virtual receiver at the compute infrastructure; and reconfiguring the traffic adapter to not receive the third inbound baseband frames.

Example 17 is a system comprising: one or more processors; and a computer-readable medium comprising instructions that, when executed by the one or more processors, cause the one or more processors to perform operations for scaling a satellite communication system, the operations comprising: running a traffic adapter, a first virtual transmitter, and a first virtual receiver at a compute infrastructure of a gateway, the first virtual transmitter configured to modulate signals based on first outbound baseband frames for transmission to a first remote terminal via a satellite, the first virtual receiver configured to demodulate signals received from the first remote terminal via the satellite to produce first inbound baseband frames, and the traffic adapter configured to transmit the first outbound baseband frames to the first virtual transmitter and receive the first inbound baseband frames from the first virtual receiver; receiving, at a management system, a request to add a second remote terminal to the satellite communication system; and responsive to receiving the request to add the second remote terminal: instantiating a second virtual receiver at the compute infrastructure, the second virtual receiver configured to demodulate signals received from the second remote terminal via the satellite to produce second inbound baseband frames; and reconfiguring the traffic adapter to receive the second inbound baseband frames from the second virtual receiver.

Example 18 is the system of example(s) 17, wherein the operations further comprise: further responsive to receiving the request to add the second remote terminal: instantiating a second virtual transmitter at the compute infrastructure, the second virtual transmitter configured to modulate signals based on second outbound baseband frames for transmission to the second remote terminal via the satellite; and reconfiguring the traffic adapter to transmit the second outbound baseband frames to the second virtual transmitter.

Example 19 is the system of example(s) 18, wherein the operations further comprise: receiving, at the management system, a request to add a third remote terminal to the satellite communication system; and responsive to receiving the request to add the third remote terminal: instantiating a third virtual receiver at the compute infrastructure, the third virtual receiver configured to demodulate signals received from the third remote terminal via the satellite to produce third inbound baseband frames; and reconfiguring the traffic adapter to receive the third inbound baseband frames from the third virtual receiver.

Example 20 is the system of example(s) 19, wherein the operations further comprise: further responsive to receiving the request to add the third remote terminal: instantiating a third virtual transmitter at the compute infrastructure, the third virtual transmitter configured to modulate signals based on third outbound baseband frames for transmission to the third remote terminal via the satellite; and reconfiguring the traffic adapter to transmit the third outbound baseband frames to the third virtual transmitter.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

FIG. 6 illustrates a method of scaling a satellite communication system.

Figure 1:
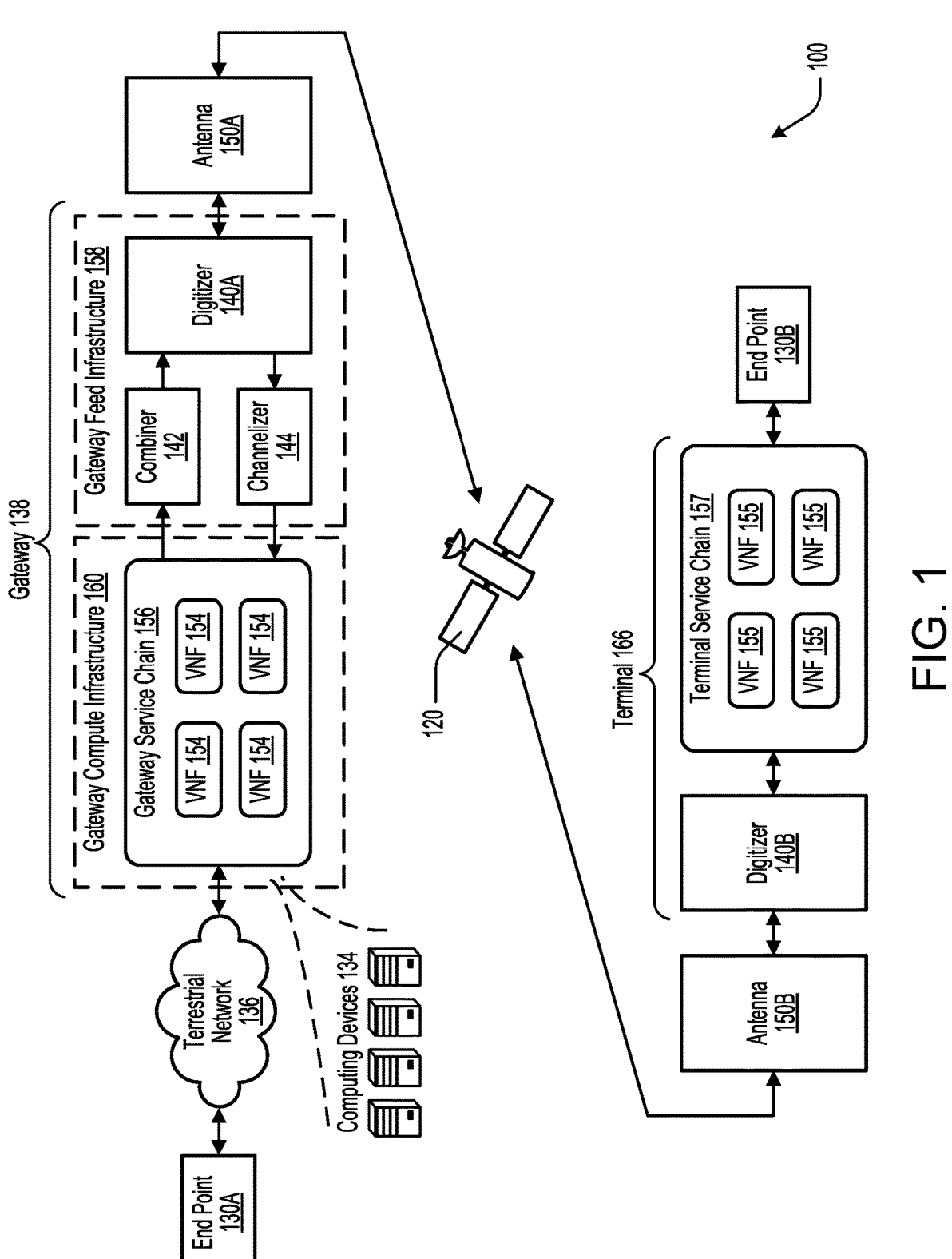
FIG. 1 illustrates an example communication path between end points enabled by a satellite communication system.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label, irrespective of the suffix.

DETAILED DESCRIPTION OF THE INVENTION

Embodiments of the present disclosure relate to dynamically scalable satellite communication systems and networks. The scalability of the disclosed systems is enabled by virtual network functions (VNFs) or cloud-native network functions (CNFs) running on onsite or offsite infrastructure. Some embodiments include a gateway and a number of terminals in communication with the gateway via a satellite link. A traffic adapter running at the gateway can dynamically reconfigured to allow the number of terminals to scale from 1:n without needing to make changes at the hardware level. The traffic adapter can be connected to a varying number of demodulators (or "virtual receivers") based on the number of terminals, generally in a one-to-one arrangement.

The traffic adapter can also be connected to a number of modulators (or "virtual transmitters") based on the number of terminals as well as the network type being implemented. For a single channel per carrier (SCPC) network, a virtual transmitter can be instantiated for each terminal in a one-to-one arrangement. In time division multiple access (TDMA) or frequency division multiple access (FDMA) networks with multiple terminals, a single virtual transmitter can be instantiated and configured to combine packets destined to different terminals in a single baseband frame. Such packets can be labeled by an encapsulator implemented within the traffic adapter according to their service ID.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

The figures herein follow a numbering convention in which the first digit or digits correspond to the figure number and the remaining digits identify an element or component in the figure. Similar elements or components between different figures may be identified by the use of similar digits. For example, 108 may reference element "08" in FIG. 1, and a similar element may be referenced as 208 in FIG. 2. As will be appreciated, elements shown in the various embodiments herein can be added, exchanged, and eliminated so as to provide a number of additional embodiments of the present disclosure. In addition, the proportion and the relative scale of the elements provided in the figures are intended to illustrate certain embodiments of the present disclosure and should not be taken in a limiting sense.

FIG. 1 illustrates an example communication path between an end point 130A and an end point 130B enabled by a satellite communication system 100, in accordance with some embodiments of the present disclosure. In the illustrated example, satellite communication system 100 includes a gateway 138 in communication with a terminal 166 via a satellite 120. In various examples, satellite 120 may send and receive wireless signals within one or more bands of a number of possible frequency bands between 1-300 GHz including, for example, 1 GHz and 300 GHz, including L Band (1-2 GHz), C-Band (4-8 GHz), X-Band (8-12 GHz), Ku-Band (12-18 GHz), Ka-Band (26.5-40 GHz), S-Band (2-4 GHz), and V-Band (40-75 GHz).

In various examples, end points 130 may correspond to portable mobile devices, internet of things (IoT) devices, desktop computers, user terminals, or any of a number of devices with communication capabilities. Alternatively, end points 130 may correspond to networks such as mobile towers, mining sites, ships, planes, or the like. In one example, end point 130A may correspond to a service and end point 130B may correspond to a consumer. It should be understood that the satellite communication environment may comprise other end points 110 and/or other arrangements of components than those illustrated. Furthermore, multiple communication paths may be constructed and operated in parallel, and separate communication paths may have different arrangements from each other.

End point 130A may be communicatively connected via a terrestrial network 136 (e.g., comprising the Internet, a private telecom backbone, or a cloud compute center) to a gateway 138. Gateway 138 may include one or more switches (not shown) to facilitate communication between the various components, such as a first switch at the boundary between terrestrial network 136 and a gateway compute infrastructure 160, and a second switch at the boundary between gateway compute infrastructure 160 and a gateway feed infrastructure 158. Such switches may be physical or virtual Gigabit Ethernet (GigE) switches. However, it should be understood that the above-described first and second switches could be implemented in the same switch. In some examples, the first switch may implement transport from terrestrial network 136 to a VNF 154 within a gateway service chain 156. In such a case, VNF 154 may act as a User Network Interface (UNI) or an External Network-Network Interface (ENNI) as defined by the applicable MEF Ethernet services and MEF operator services standards. Alternatively, the first switch may itself represent the UNI as defined by the applicable MEF standards.

Gateway compute infrastructure 160 may include a set of computing devices 134 situated onsite (at a same physical location) or offsite (at a different physical location) relative to antenna 150. In some examples, computing devices 134 may comprise general-purpose computers or servers capable of running VNFs 154 and other virtualization software such as hypervisors to support gateway service chain 156. In some examples, computing devices 134 may employ x86 architectures, ARM architectures, RISC-V architectures, among other possibilities. Computing devices 134 may be configured as clusters, data centers, warehouse-scale computers, among other possibilities. Gateway compute infrastructure 160 may further include suitable storage systems that provide persistent and reliable storage in support of VNFs 154.

In some examples, gateway compute infrastructure 160 may include a managing system that instantiates and configures one or more VNFs 154 to form gateway service chain 156. Two sets of one or more VNFs 154 may provide two-way communication, including a transmission path and a reception path, between terrestrial network 136 and a gateway feed infrastructure 158 of gateway 156. It should be understood that in an example in which gateway service chain 156 provides only one-way communication, VNFs 154 may provide only a transmission path without providing a reception path. The set of VNFs 154 (e.g., implementing a gateway) on the forward path towards the link to satellite 120, may comprise or constitute a traffic handler, an encapsulator (e.g., implementing generic stream encapsulation (GSE)), a modulator (e.g., the OpenSpace™ Wideband Software modulator, offered by Kratos Defense & Security Solutions, Inc. of San Diego, California), a combiner, an encryption/decryption VNF, a time division multiple access (TDMA) resource allocator, an antenna controller, among other possibilities.

This set of VNFs 154 on the transmission path may convert protocol data units (PDUs) into a digital signal (such as a digital intermediate frequency (IF) waveform or a composite digital IF waveform). For example, the traffic handler may process data link layer (e.g., Layer 2 or L2 in the Open Systems Interconnection (OSI) model) and/or network layer (e.g., Layer 3 or L3 in the OSI model) traffic, and provide the processed Ethernet frames or IP packets to the encapsulator. The encapsulator may convert the PDUs into baseband frames, and provide the baseband frames to the modulator. A baseband frame may be the basic unit of transmission in satellite communication system 100. The encapsulator may form baseband frames in accordance with the 5G standard, the DVB-S2x standard, described in European Telecommunications Standards Institute (ETSI) European Standard (EN) 302 307-1 v1.4.1 (2014 November), among other possible standards. The encapsulator may comprise one or more VNFs 154 (or software subprocesses) that perform one or more of the following functions: frame chopping, forward modulation selection (e.g., with Adaptive Coding and Modulation (ACM)), Ethernet bridge (e.g., Media Access Control (MAC) table, smart bridging/learning/relay, etc.), Address Resolution Protocol (ARP) (e.g., Ethernet MAC discovery), VLAN manipulation (e.g., to rewrite Ethernet frames on ingress/egress based on the MEF service definition), header compression (e.g., Robust Header Compression (ROHC)); and/or OTA optimization (e.g., Space Communications Protocol Specifications (SCPS)/TCP-Acceleration). The modulator may convert the baseband frames into signal data packets in accordance with a particular standard, including the standards of the Digital Intermediate Frequency Interoperability (DIFI) Consortium in the DIFI/Institute of Electrical and Electronics Engineers (IEEE) 1.0 specification, the VMEbus International Trade Association (VITA) standard, the enhanced Common Public Radio Interface (eCPRI) standard, among other possibilities. In an embodiment, the encapsulator and the traffic handler may be implemented as a single VNF 154, referred to as a virtualized traffic adaptor (vModem). The VNF-implemented combiner or a combiner 142 (implemented in hardware) may combine the signal data packets into a digital signal and provide the digital signal to a digitizer 140A, which may convert the digital signal into an analog signal.

The set of VNFs 154 on the return path may comprise or constitute, in order, a digital channelizer (e.g., the OpenSpace™ Wideband Channelizer, offered by Kratos Defense & Security Solutions, Inc. of San Diego, California), a demodulator (e.g., the OpenSpace™ Wideband Software Receiver, offered by Kratos Defense & Security Solutions, Inc. of San Diego, California), and a decapsulator. This set of VNFs 154 on the reception path may convert a digital signal (such as a digital IF waveform or a composite digital IF waveform) to PDUs, which may be Ethernet frames or IP packets, among other possibilities. For example, the VNF-implemented channelizer or a channelizer 144 (implemented in hardware) may receive a digital signal from digitizer 140A, which has converted an analog signal into the digital signal, and divide the digital signal into signal data packets. The demodulator may convert the signal data packets to baseband frames, and provide the baseband frames to the decapsulator. The decapsulator may convert the baseband frames into PDUs, which may be transmitted, via terrestrial network 136, to end point 130A. It should be understood that the demodulator performs the reverse function(s) of the modulator, and the decapsulator performs the reverse function(s) of the encapsulator. In an embodiment, the decapsulator and demodulator may be implemented as a single VNF 154, for example, together with the traffic handler, encapsulator, and modulator, in a vModem. In other words, a vModem may consist of a single VNF 154 that implements all of the functions of the traffic handler, encapsulator/decapsulator, and modulator/demodulator.

In some embodiments, in which gateway service chain 156 implements a vModem, the vModem may comprise one or more modulators that are configured to modulate waveforms according to a digital satellite broadcast standard and/or one or more demodulators that are configured to demodulate waveforms according to a digital satellite broadcast standard. Such a vModem may provide carrier ethernet (CE) services, in which case the vModem may comprise one or more encapsulators that convert Ethernet frames into baseband frames that are modulated into waveforms by the modulator(s), and one or more decapsulators that convert baseband frames, which have been demodulated from waveforms by the demodulator(s), into Ethernet frames. The digital satellite broadcast standard may be a digital satellite television broadcast standard, such as the DVB-S2X standard managed by the Digital Video Broadcasting (DVB) Project. While a digital satellite broadcast standard, such as a DVB standard, is used as an example, the vModem may be configured to modulate and demodulate waveforms according to other standards for wideband digital communication, such as orthogonal frequency-division multiplexing (OFDM), or the like.

The digital signal from combiner 142 is transmitted to digitizer 140A, which converts the digital signal output by combiner 142 into an analog transmission signal for communication to satellite 120. Digitizer 140A further digitizes analog reception signals from satellite 120 into digital signals for use by channelizer 144. In some examples, digitizer 140A may be software-defined. As one example, digitizer 140A may be a SpectralNet™, which is a carrier-grade RF digitizer, offered by Kratos Defense & Security Solutions, Inc. of San Diego, California. Digitizer 140A communicates with antenna 150A. In particular, digitizer 140A provides the transmission signal to antenna 150A, which transmits the transmission signal to satellite 120. In addition, in two-way communications, antenna 150A receives a reception signal from satellite 120, and provides the reception signal to digitizer 140A.

In various examples, antenna 150A may be a parabolic reflector antenna, a flat panel antenna, a phased array antenna, a helical antenna, a patch antenna, a horn antenna, among other possibilities. In some examples, antenna 150A may be an electronically steered antenna that can use electronic means to control the direction and shape of its radiation pattern. Such an antenna can generate multiple beams simultaneously, allowing it to transmit or receive signals in multiple directions at the same time. Antenna 150A may include both the physical antenna as well as the corresponding radio frequency (RF) subsystem, which may include a combination of diplexers, amplifiers (e.g., low noise amplifiers (LNAs)), upconverters, and downconverters (e.g., low-noise block downconverters (LNBs)) depending on the specific frequency band and application.

Satellite 120 relays wireless signals from antenna 150A to antenna 150B. In two-way communications, satellite 120 also relays wireless signals from antenna 150B to antenna 150A. Antenna 150B may be functionally similar or identical to antenna 150A, and therefore, any description of antenna 150A applies equally to antenna 150B, which may not be redundantly described herein. Similarly, digitizer 140B may be functionally similar or identical to digitizer 140A, and therefore, any description of digitizer 140A applies equally to digitizer 140B, which may not be redundantly described herein.

Digitizer 140B may communicate directly with a terminal service chain 157 of a terminal compute infrastructure. Terminal service chain 157 may comprise a set of VNF(s) 155 forming a reception path from digitizer 140B to end point 130B. In two-way communications, terminal service chain 157 may also comprise a set of VNFs 155 forming a transmission path from end point 130B to digitizer 140B. The reception and transmission paths may be identical or similar to the reception and transmission paths described with respect to gateway service chain 156. For example, the reception path may comprise a demodulator followed by a decapsulator to convert signal frames into PDUs, and the transmission path may comprise an encapsulator followed by a modulator to convert PDUs into signal frames. The traffic handler, encapsulator, decapsulator, modulator, and demodulator may all be similar or identical to those described with respect to gateway service chain 156, and therefore, the descriptions of those components with respect to gateway service chain 156 apply equally to those components in terminal service chain 157.

Terminal service chain 157 may communicate with end point 130B. For example, the traffic handler of terminal service chain 157 may transmit Ethernet frames to end point 130B. In addition, in two-way communications, the encapsulator of terminal service chain 157 may receive PDUs from end point 130B. Thus, the combination of gateway service chain 156 and terminal service chain 157 enable one-way or two-way communications between end points 110A and 110B over a satellite link.

Gateway service chain 156 and terminal service chain 157 may comprise one or more of the software-defined components (e.g., VNFs and/or digitizers) described in International Patent App. Nos. PCT/US2021/033867, filed on May 24, 2021, PCT/US2021/033875, filed on May 24, 2021, PCT/US2021/033905, filed on May 24, 2021, and PCT/US2021/062689, filed on Dec. 9, 2021, which are all hereby incorporated herein by reference as if set forth in full.

Advantageously, the utilization of VNFs and software-defined components (e.g., digitizers 140A and 140B) to perform various functions, aid in automation and scalability. Embodiments may minimize the presence of physical hardware components, such that satellite communication system 100 can be dynamically reconfigured (e.g., added, updated, destroyed, increased or decreased in dimension, etc.) in real time, primarily using in-band network communications, to adapt to the unique multivariate satcom environment (e.g., changing traffic patterns, RF interference, atmospheric characteristics, antenna conditions, path length, etc.).

Notably, dynamic reconfiguration of VNFs in a cloud computing environment can be used, not only to increase the dimensions of the computing resources (e.g., number of vCPUs, amount of memory and/or disk storage, network throughput, etc.) used for satellite communication system 100 on demand to ensure the sufficiency of the satellite communication system, but also to decrease the dimensions of the computing resources on demand to optimize the utilization of the hardware. For example, favorable changes in the satcom environment may improve performance of satellite communication system 100, such that satellite communication system 100 is providing significantly better performance than is required by the service level agreement. In this case, the management system may determine that gateway service chain 156 and terminal service chain 157 are insufficient, and update the service chains to reduce the resources used in the service chains (e.g., by reducing RF bandwidth usage, resizing one or more VNFs, swapping to a service chain with reduced dimensions, etc.). This is in contrast to conventional hardware-based service chains in which unused resources would simply be idled or otherwise ignored, representing a sunk cost that cannot be recouped.

Figure 2:
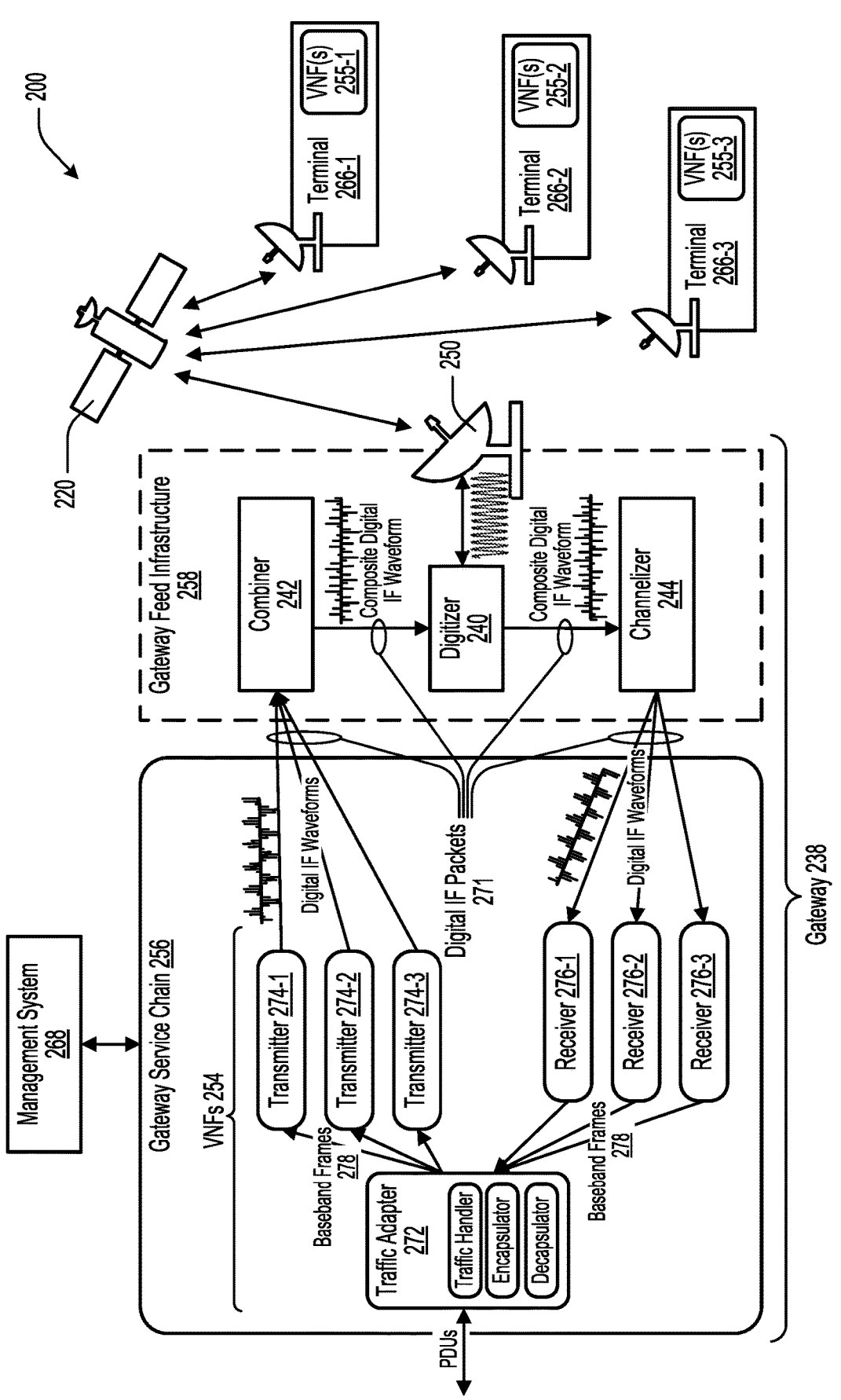
FIG. 2 illustrates an example satellite communication system including a gateway and a set of terminals.

FIG. 2 illustrates an example satellite communication system 200 including a gateway 238 and a set of terminals 266 (or "remote terminals"), in accordance with some embodiments of the present disclosure. In the illustrated example, satellite communication system 200 includes a gateway 238 (or "hub") in communication with each of terminals 266 via a satellite 220. Gateway 238 may include a gateway feed infrastructure 258 that serves as an onsite infrastructure (close to antenna 250, e.g., at a same physical location) that may perform primarily signal digitization and signal routing-related tasks and a gateway compute infrastructure that can be onsite or offsite infrastructure (far from antenna 250, e.g., at a different physical location) that supports a gateway service chain 256 that performs primarily signal processing and packet processing-related tasks.

The gateway compute infrastructure may include one or more computers, clusters, a data center, or a warehouse-scale computer. The computing devices comprising the gateway compute infrastructure and/or gateway feed infrastructure 258 may include general-purpose computers or servers employing x86 architectures, ARM architectures, RISC-V architectures, among other possibilities.

Gateway 238 may include a gateway service chain 256 comprising a set of VNFs 254 running on the gateway compute infrastructure. Example VNFs include one or more traffic adapters 272, one or more virtual transmitters 274, one or more virtual receivers 276, among other possibilities. Each of VNFs 254 may be instantiated and configured by a management system 268 that scales up or down the number of active VNFs based on the number of active terminals 266. Management system 268 may further configure VNFs 254 such that satellite communication system 200 implements any one of a number of network topologies, including a single channel per carrier (SCPC) network, a TDMA network, a frequency division multiple access (FDMA) network, a mesh network, among other possibilities.

VNFs 254 may include one or more virtual transmitters 274 that provide one or more transmission paths between a terrestrial network and a gateway feed infrastructure 258 of gateway 256. Each of the set of virtual transmitters 274 on a transmission path may comprise or constitute a modulator (e.g., the OpenSpace™ Wideband Software modulator) that converts incoming baseband frames 278 into digital IF packets 271 containing digital waveforms at IF or RF frequencies (or "digital IF waveforms"). Traffic adapter 272 acts as the bridge between the terrestrial network and the satellite network. In some examples, traffic adapter 272 may include a traffic handler that processes data link layer (e.g., Layer 2 in the OSI model) and/or network layer (e.g., Layer 3 in the OSI model) traffic and provides the processed PDUs to the encapsulator, which convert the PDUs into baseband frames 278 and provides baseband frames 278 to one of virtual transmitters 274. Each of virtual transmitters 274 may implement a modulator that converts baseband frames 278 into digital IF packets 271 (e.g., according to the standards of the DIFI Consortium in the DIFI/IEEE 1.2 specification) to create the digital IF waveforms.

Digital IF packets 271 generated by virtual transmitters 274 may be fed into a combiner 242 that combines the multiple digital IF waveforms into a single composite signal (or "composite digital IF waveform"). Digital IF packets 271 containing the composite digital IF waveform is fed into a digitizer 240 that converts the digital signal into an analog signal in preparation for wireless transmission via an antenna 250. While combiner 242 is illustrated in FIG. 2 as being an element of gateway feed infrastructure 258, it is to be understood that a combiner VNF (or multiple combiner VNFs) may be instantiated by management system 268 to perform similar functionality.

On the reception path, digitizer 240 digitizes analog signals received from satellite 220 to generate digital IF packets 271 containing digital IF waveforms (e.g., a composite digital IF waveform) of the received analog signals for use by a channelizer 244. The composite digital IF waveform received by channelizer 244 may be a wide-band spectrum (e.g., 100 MHz, 500 MHz, 300 GHz, etc.) that may contain several signals within that segment of the frequency band. In some instances, channelizer 244 divides the composite digital IF waveform into separate digital IF waveforms and sends the waveforms (in the form of digital IF packets 271) to appropriate virtual receivers 276. While channelizer 244 is illustrated in FIG. 2 as being an element of gateway feed infrastructure 258, it is to be understood that a channelizer VNF (or multiple channelizer VNFs) may be instantiated by management system 268 to perform similar functionality. VNFs 254 may include one or more virtual receivers 276 that provide one or more reception paths between gateway feed infrastructure 258 and a terrestrial network. Each of the set of virtual receivers 276 on a reception path may comprise or constitute a demodulator (e.g., the OpenSpace™ Wideband Software Receiver) that converts incoming digital IF packets 271 containing digital IF waveforms into baseband frames 278. In some examples, baseband frames 278 produced by virtual receivers are sent to the decapsulator of traffic adapter 272. The decapsulator may convert baseband frames 278 into Ethernet frames and pass the Ethernet frames to the traffic handler, which processes and provides the Ethernet frames to a terrestrial network.

Satellite 220 relays wireless signals from antenna 250 to the antennas of terminals 266, or vice versa. In two-way communications, satellite 220 also relays wireless signals from the antennas of terminals 266 to antenna 250. In some examples, each of terminals 266 may include hardware infrastructure to support one or more VNFs 255. In some examples, VNFs 255 at each of terminals 266 may implement a vModem that comprises one or more modulators that are configured to modulate waveforms according to a digital satellite broadcast standard and/or one or more demodulators that are configured to demodulate waveforms according to the digital satellite broadcast standard. Such a vModem may provide CE services, in which case the vModem may comprise one or more encapsulators that convert Ethernet frames into baseband frames that are modulated into waveforms by the modulator(s), and one or more decapsulators that convert baseband frames, which have been demodulated from waveforms by the demodulator(s), into Ethernet frames, together with a traffic handler that connects the encapsulators and decapsulators with the terrestrial networks connected to terminals 266.

Figure 3:
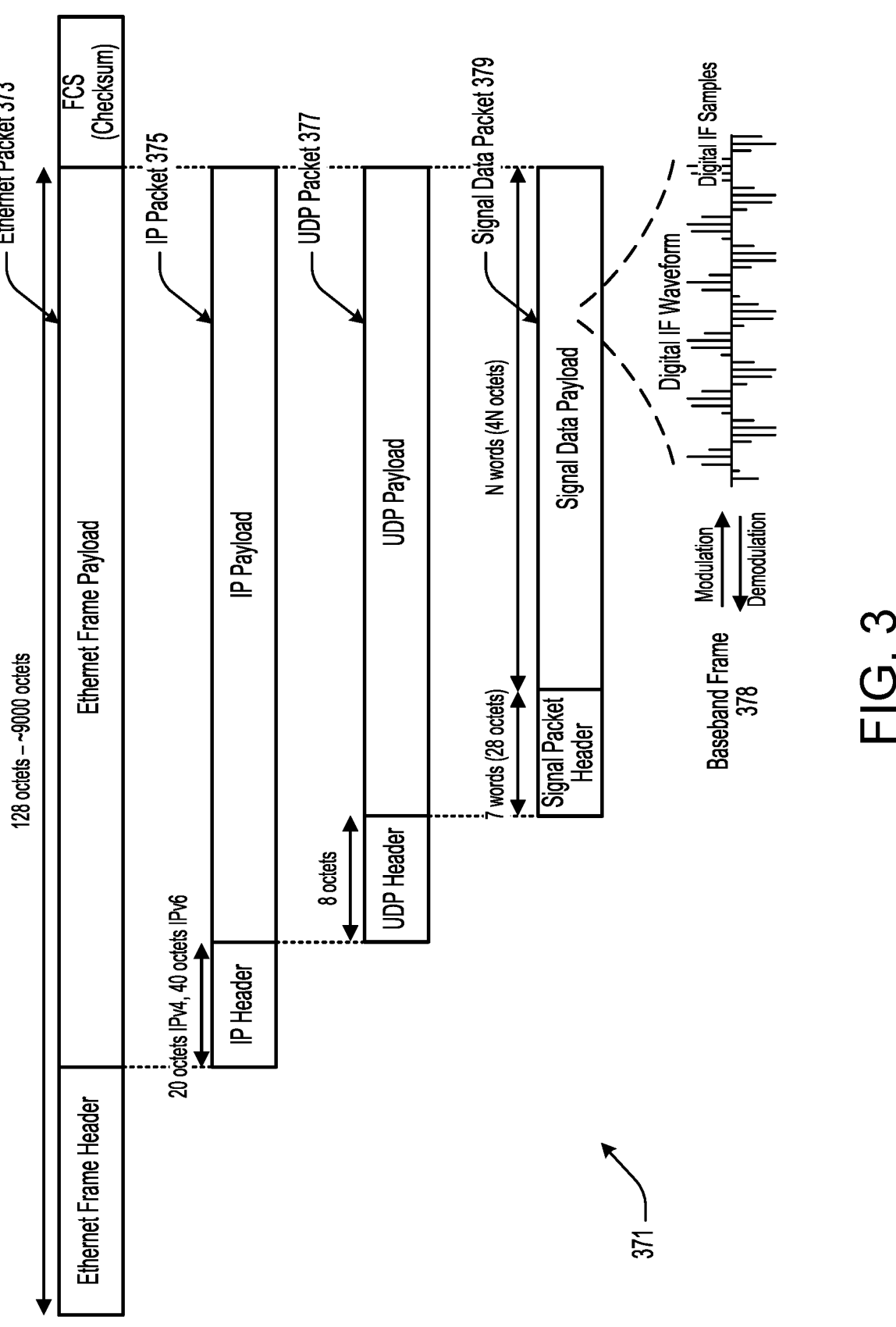
FIG. 3 illustrates an example digital IF packet with multiple protocol layers.

FIG. 3 illustrates an example digital IF packet 371 with multiple protocol layers, in accordance with some embodiments of the present disclosure. In the illustrated example, digital IF packet 371 includes a digital IF waveform contained within the signal data payload of a signal data packet 379. The digital IF waveform may represent the modulated form of one or more baseband frames 378 (or portions of one or more baseband frames 378), such that the baseband frames may be recovered by demodulating the digital IF waveform contained within the signal data payload. Signal data packet 379 may also include a signal packet header, which may implement the VITA standard (e.g., VITA 49.2 specification) or another standard.

In some examples, signal data packet 379 is encapsulated within a UDP packet 377 having a UDP header and UDP payload. UDP packet 377 may be encapsulated within an IP packet 375 having an IP header and IP payload, which may be encapsulated within an Ethernet packet 373 having an Ethernet frame header and Ethernet frame payload. In some examples, the total Ethernet packet size varies based on the number and size of the data samples in the signal data payload of signal data packet 379. There may be a fixed overhead within the Ethernet frame which comprises the IP header (20 octets for IPv4 or 40 octets (minimum) for IPv6), the UDP header (8 octets), the signal packet header (28 octets). In some examples, the Ethernet frame payload is adjustable from 128 octets to approximately 9000 octets.

In some examples, digital IF packet 371 may include different packet classes for signal data packet 379. In a first packet class, signal data packet 379 may be a regular data packet that includes the data for the digital samples forming the digital IF waveform. In a second packet class, signal data packet 379 may be a context packet that includes data to ensure standardization of the transport of metadata describing the sampled signal data. Such data may include the IF reference frequency, the sample rate, the bit depth, the equivalent analog bandwidth of the signal represented by the digital stream, the frequency offset of the center of the band occupied by the signal from the IF reference frequency, among other possibilities. In a third packet class, signal data packet 379 may be a command packet that includes data used to provide and acknowledge device settings and support control of timing to permit synchronization of upstream or downstream devices.

Figures 4A, 4B, 4C:
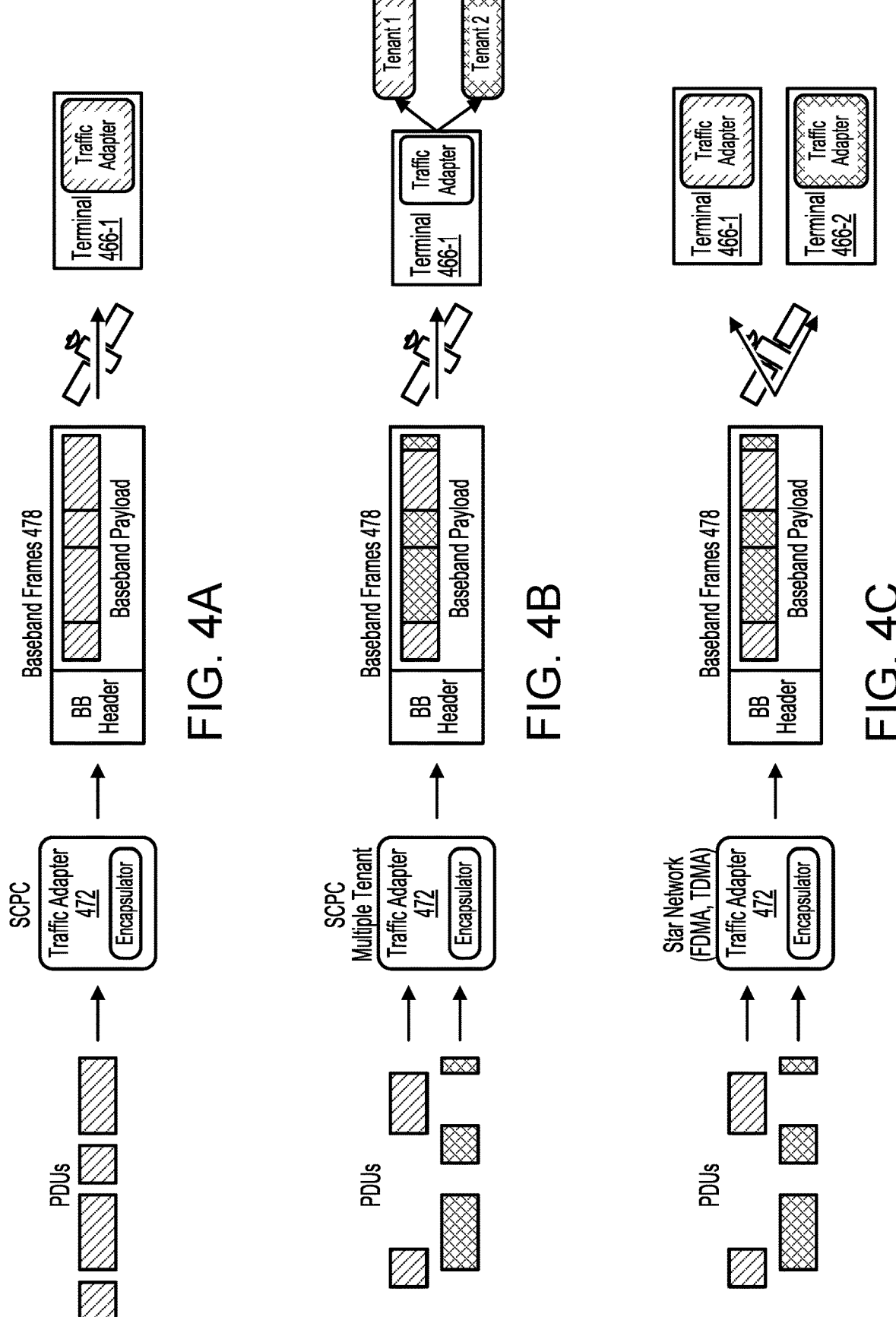
FIGS. 4A-4C illustrate example traffic adapters implementing different network types.

FIGS. 4A-4C illustrate example traffic adapters 472 implementing different network types, in accordance with some embodiments of the present disclosure. In FIG. 4A, traffic adapter 472 is configured by the management system to implement a SCPC (single tenant) network connection type. The encapsulator processes incoming PDUs destined for a terminal 466-1 by encapsulating the PDUs into a baseband frame 478 and adding an encapsulation header to each PDU and a baseband header to the entire baseband frame 478. The encapsulation headers (based on ETSI TS 102 606) include an identifier for terminal 466-1, an identifier of the encapsulated PDU's type, and an indicator of the length of the PDU. They may further include information to allow splitting an encapsulated PDU into multiple fragments to be distributed over multiple baseband frames 478. The baseband header includes, among other elements, information about the contained encapsulation structure and the total size of the payload. Upon receiving baseband frame 478, a traffic adapter of terminal 466-1 may decapsulate the baseband frame to recover the PDUs.

In FIG. 4B, traffic adapter 472 is configured by the management system to implement a SCPC (multiple tenant) network connection type. The encapsulator processes a first set of PDUs destined for Tenant 1 via terminal 466-1 and a second set of PDUs destined for Tenant 2 via terminal 466-1 by encapsulating both sets of PDUs (received within a particular time window) into a single baseband frame 478 and adding a baseband header to baseband frame 478 and individual encapsulation headers to each PDU. The encapsulation headers may include an identifier for Tenant 1, an identifier for Tenant 2, an indicator of the encapsulated PDU's content, an indicator of the size of the encapsulated PDU, and information about fragmentation of the encapsulated PDU across multiple baseband frames 478, among other possibilities. The baseband header includes, among other elements, information about the contained encapsulation structure and the total size of the payload. Upon receiving baseband frame 478, the traffic adapter of terminal 466-1 may decapsulate baseband frame 478 to recover and separate the PDUs, and may route the PDUs toward Tenant 1 and Tenant 2 as appropriate.

In FIG. 4C, traffic adapter 472 is configured by the management system to implement an FDMA or TDMA network connection type. The encapsulator processes a first set of PDUs destined for terminal 466-1 and a second set of PDUs destined for terminal 466-2 by encapsulating both sets of PDUs (received within a particular time window) into a single baseband frame 478 and adding a baseband header to baseband frame 478 and individual encapsulation headers to each PDU. The encapsulation headers include an identifier for terminal 366-1, an identifier for terminal 366-2, an indicator of the encapsulated PDU's content, an indicator of the size of the encapsulated PDU, and information about fragmentation of the encapsulated PDU across multiple baseband frames 478, among other possibilities. They may further include information to allow splitting an encapsulated PDU into multiple fragments to be distributed over multiple baseband frames 478. The baseband header includes, among other elements, information about the contained encapsulation structure and the total size of the payload. Upon receiving baseband frame 478, the traffic adapter of terminal 466-1 may decapsulate baseband frame 478 to recover the PDUs destined for terminal 466-1, and the traffic adapter of terminal 466-2 may decapsulate baseband frame 478 to recover the PDUs destined for terminal 466-2.

Figures 5A, 5B, 5C, 5D:
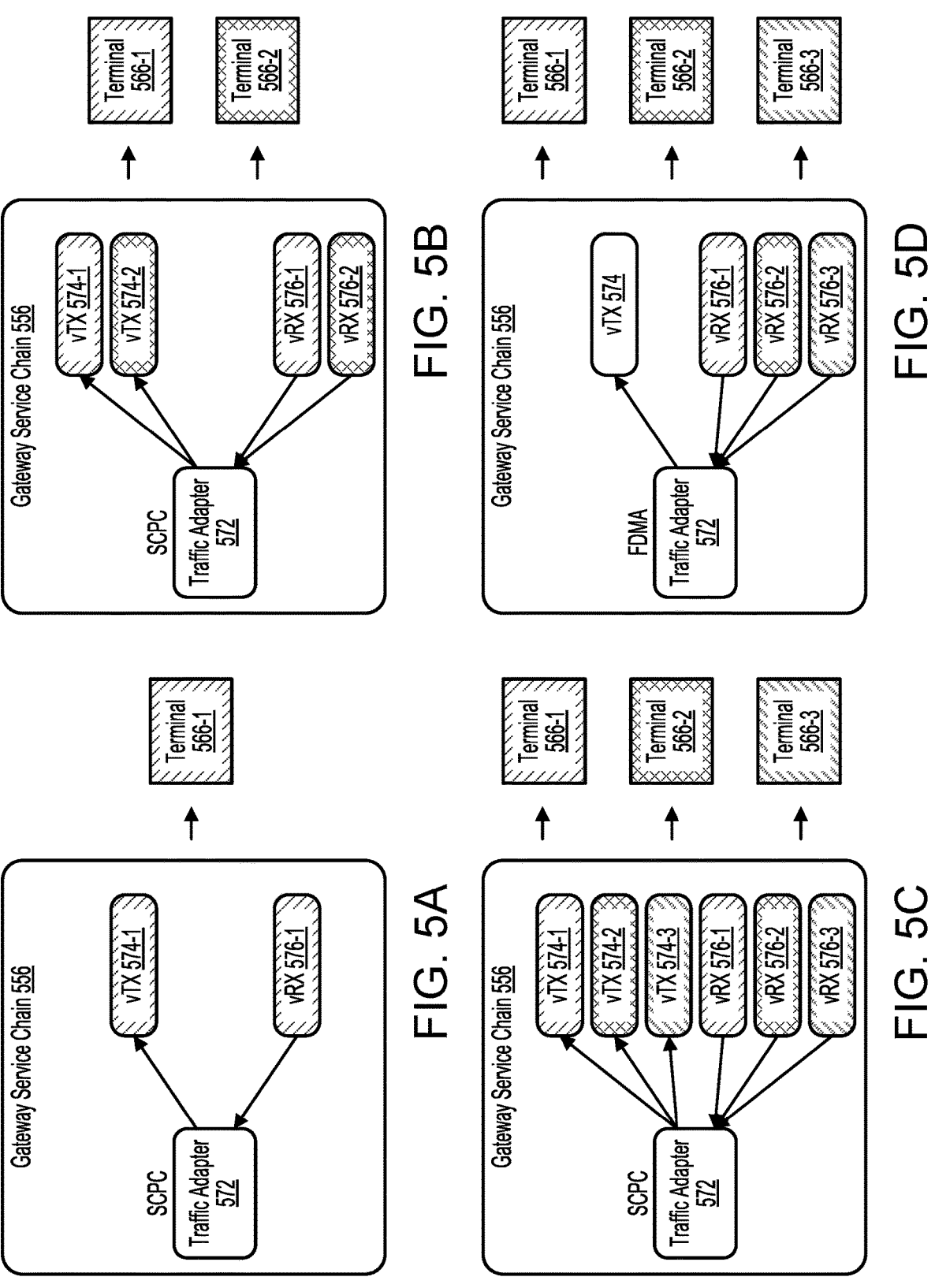
FIGS. 5A-5H illustrate an example scaling of a satellite communication system, in accordance with some embodiments of the present disclosure.

FIGS. 5A-5H illustrate an example scaling of a satellite communication system, in accordance with some embodiments of the present disclosure. The satellite communication system may include a changing number of VNFs running at a compute infrastructure of a gateway based on requests made to a management system coupled to the compute infrastructure. In FIG. 5A, the management system may receive a request to add a terminal 566-1 to the satellite communication system and to implement an SCPC network type. In response, the management system may instantiate a traffic adapter 572, a virtual transmitter 574-1, and a virtual receiver 576-1 to form a gateway service chain 556 and may configure traffic adapter 572, virtual transmitter 574-1, and virtual receiver 576-1 to implement the SCPC network type. For example, traffic adapter 572 may be configured to generate first outbound baseband frames to transmit to virtual transmitter 574-1 and receive first inbound baseband frames from virtual receiver 576-1, virtual transmitter 574-1 may be configured to modulate signals based on the first outbound baseband frames in accordance with the SCPC network type for transmission to terminal 566-1, and virtual receiver 576-1 may be configured to demodulate signals received from terminal 566-1 to produce the first inbound baseband frames.

In FIG. 5B, the management system may receive a request to add a terminal 566-2 to the satellite communication system. In response, the management system may instantiate a virtual transmitter 574-2 and a virtual receiver 576-2 and reconfigure traffic adapter 572. For example, traffic adapter 572 may be reconfigured to generate second outbound baseband frames to transmit to virtual transmitter 574-2 and receive second inbound baseband frames from virtual receiver 576-2, virtual transmitter 574-2 may be configured to modulate signals based on the second outbound baseband frames in accordance with the SCPC network type for transmission to terminal 566-2, and virtual receiver 576-2 may be configured to demodulate signals received from terminal 566-2 to produce the second inbound baseband frames.

In FIG. 5C, the management system may receive a request to add a terminal 566-3 to the satellite communication system. In response, the management system may instantiate a virtual transmitter 574-3 and a virtual receiver 576-3 and reconfigure traffic adapter 572. For example, traffic adapter 572 may be reconfigured to generate third outbound baseband frames to transmit to virtual transmitter 574-3 and receive third inbound baseband frames from virtual receiver 576-3, virtual transmitter 574-3 may be configured to modulate signals based on the third outbound baseband frames in accordance with the SCPC network type for transmission to terminal 566-3, and virtual receiver 576-3 may be configured to demodulate signals received from terminal 566-3 to produce the third inbound baseband frames.

In FIG. 5D, the management system may receive a request to switch from the SCPC network type to implement an FDMA network type. In response, the management system may terminate virtual transmitters 574-1, 574-2, and 574-3, instantiate a single virtual transmitter 574, reconfigure traffic adapter 572 to generate combined outbound baseband frames to transmit to virtual transmitter 574 for transmission to each of terminals 566-1, 566-2, and 566-3, configure virtual transmitter 574 to modulate signals based on the combined outbound baseband frames in accordance with the FDMA network type for transmission to each of terminals 566-1, 566-2, and 566-3, and reconfigure virtual receivers 576-1, 576-2, and 576-3 to demodulate signals received from terminals 566-1, 566-2, 566-3, respectively, in accordance with the FDMA network type.

Figures 5E, 5F, 5G, 5H:
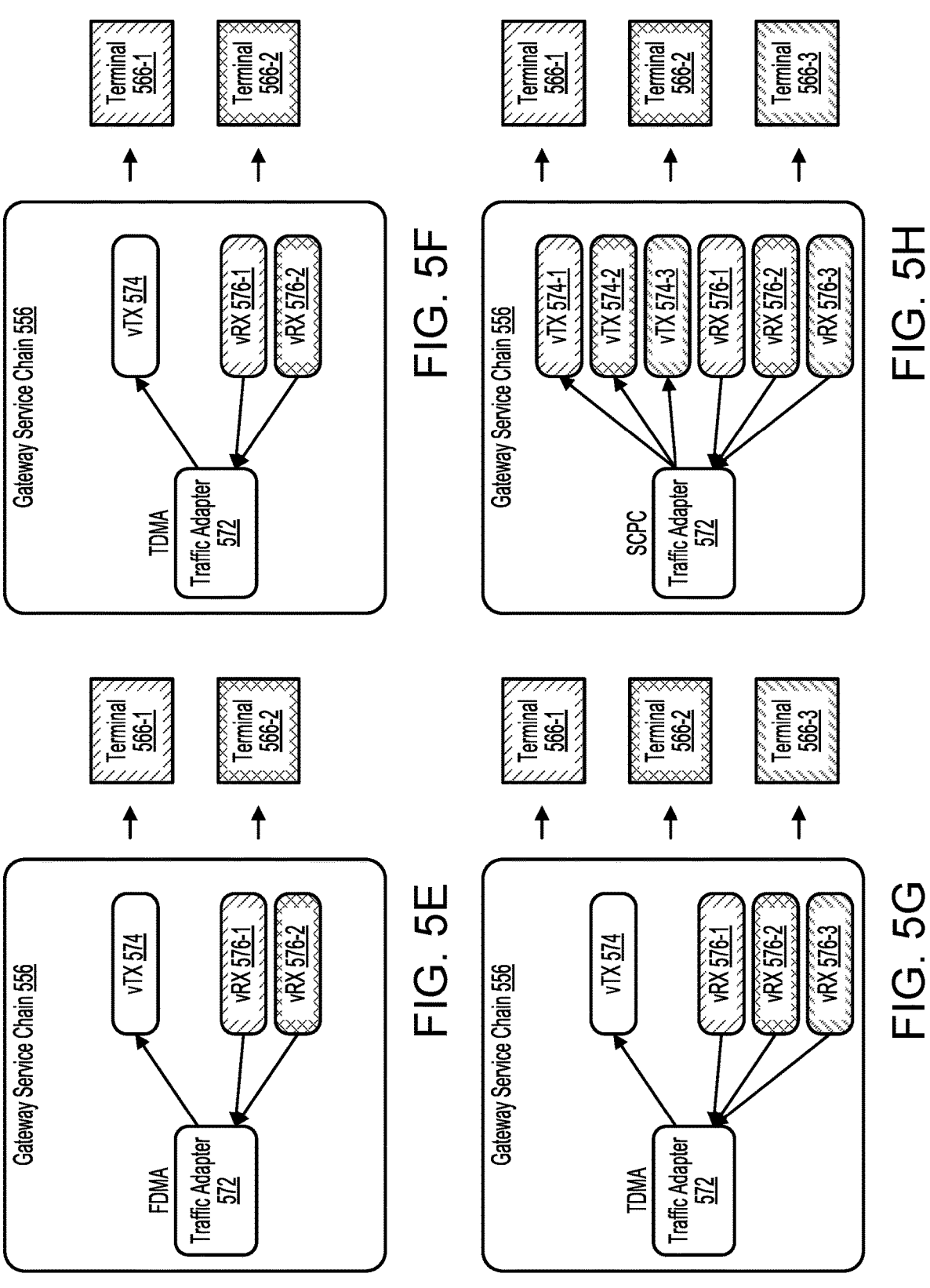

In FIG. 5E, the management system may receive a request to remove a terminal 566-3 from the satellite communication system. In response, the management system may terminate virtual receiver 576-3 and reconfigure traffic adapter 572 and virtual transmitter 574. For example, traffic adapter 572 may be reconfigured to generate the combined outbound baseband frames to transmit to virtual transmitter 574 for transmission to each of terminals 566-1 and 566-2 but not terminal 566-3 and to not receive the third inbound baseband frames, and virtual transmitter 574 may be reconfigured to modulate signals based on the combined outbound baseband frames in accordance with the FDMA network type for transmission to each of terminals 566-1 and 566-2 but not terminal 566-3.

In FIG. 5F, the management system may receive a request to switch from the FDMA network type to implement an TDMA network type. In response, the management system may reconfigure traffic adapter 572, virtual transmitter 574, and virtual receivers 576-1 and 576-2 to implement the TDMA network type. For example, virtual transmitter 574 may be reconfigured to modulate signals based on the combined outbound baseband frames in accordance with the TDMA network type for transmission to each of terminals 566-1 and 566-2, and virtual receivers 576-1 and 576-2 may be reconfigured to demodulate signals received from terminals 566-1 and 566-2, respectively, in accordance with the TDMA network type.

In FIG. 5G, the management system may receive a request to add terminal 566-3 to the satellite communication system. In response, the management system may instantiate a virtual receiver 576-3 and reconfigure traffic adapter 572 and virtual transmitter 574. For example, virtual receiver 576-3 may be configured to demodulate signals received from terminal 566-3 to produce the third inbound baseband frames, traffic adapter 572 may be reconfigured to generate combined outbound baseband frames to transmit to virtual transmitter 574 for transmission to each of terminals 566-1, 566-2, and 566-3 and to receive the third inbound baseband frames from virtual receiver 576-3, and virtual transmitter 574 may be reconfigured to modulate signals based on the combined outbound baseband frames for transmission to each of terminals 566-1, 566-2, and 566-3.

In FIG. 5H, the management system may receive a request to switch from the TDMA network type to implement the SCPC network type. In response, the management system may terminate single virtual transmitter 574, instantiate virtual transmitters 574-1, 574-2, and 574-3, and reconfigure traffic adapter 572 and virtual receivers 576-1, 576-2, and 576-3 to implement the SCPC network type. For example, traffic adapter 572 may be reconfigured to generate first outbound baseband frames, second outbound baseband frames, and third outbound baseband frames to transmit to virtual transmitters 574-1, 574-2, and 574-3, respectively, virtual transmitters 574-1, 574-2, and 574-3 may be configured to modulate signals based on the first outbound baseband frames, second outbound baseband frames, and third outbound baseband frames in accordance with the SCPC network type for transmission to terminals 566-1, 566-2, and 566-3, respectively, and virtual receivers 576-1, 576-2, and 576-3 may be reconfigured to demodulate signals received from terminals 566-1, 566-2, and 566-3 in accordance with the SCPC network type to produce the first inbound baseband frames, second inbound baseband frames, and third inbound baseband frames, respectively.

FIG. 6 illustrates a method 600 of scaling a satellite communication system, in accordance with some embodiments of the present disclosure. Steps of method 600 may be performed in any order and/or in parallel, and one or more steps of method 600 may be optionally performed. One or more steps of method 600 may be performed by one or more processors. Method 600 may be implemented as a computer-readable medium or computer program product comprising instructions which, when the program is executed by one or more processors, cause the one or more processors to carry out the steps of method 600.

At step 602, a management system (e.g., management system 268) causes a traffic adapter (e.g., traffic adapters 272, 472, 572), a first virtual transmitter (e.g., virtual transmitters 274-1, 574-1), and a first virtual receiver (e.g., virtual receivers 276-1, 576-1) to run at a compute infrastructure (e.g., compute infrastructures 160) in support of a satellite communication system (e.g., satellite communication systems 100, 200). The satellite communication system may include a gateway (e.g., gateways 138, 238) and a first remote terminal (e.g., terminals 166, 266-1, 466, 566-1). The first virtual transmitter may be configured to modulate signals based on first outbound baseband frames (e.g., baseband frames 278, 378, 478) for transmission to a first remote terminal via a satellite (e.g., satellites 120, 220). The first virtual receiver may be configured to demodulate signals received from the first remote terminal via the satellite to produce first inbound baseband frames (e.g., baseband frames 278, 378, 478). The traffic adapter may be configured to transmit the first outbound baseband frames to the first virtual transmitter and receive the first inbound baseband frames from the first virtual receiver.

At step 604, a request is received at the management system to add a second remote terminal (e.g., terminals 166, 266-2, 466, 566-2) to the satellite communication system.

At step 606, responsive to receiving the request to add the second remote terminal, a second virtual transmitter (e.g., virtual transmitters 274-2, 574-2) and a second virtual receiver (e.g., virtual receivers 276-2, 576-2) are instantiated at the compute infrastructure by the management system. The second virtual transmitter may be configured to modulate signals based on second outbound baseband frames (e.g., baseband frames 278, 378, 478) for transmission to the second remote terminal via the satellite. The second virtual receiver may be configured to demodulate signals received from the second remote terminal via the satellite to produce second inbound baseband frames (e.g., baseband frames 278, 378, 478).

At step 608, responsive to receiving the request to add the second remote terminal, the traffic adapter is reconfigured to transmit the second outbound baseband frames to the second virtual transmitter and receive the second inbound baseband frames from the second virtual receiver.

At step 610, a request is received at the management system to add a third remote terminal (e.g., terminals 166, 266-3, 466, 566-3) to the satellite communication system.

At step 612, responsive to receiving the request to add the third remote terminal, a third virtual transmitter (e.g., virtual transmitters 274-3, 574-3) and a second virtual receiver (e.g., virtual receivers 276-3, 576-3) are instantiated at the compute infrastructure by the management system. The third virtual transmitter may be configured to modulate signals based on third outbound baseband frames (e.g., baseband frames 278, 378, 478) for transmission to the third remote terminal via the satellite. The third virtual receiver may be configured to demodulate signals received from the third remote terminal via the satellite to produce third inbound baseband frames (e.g., baseband frames 278, 378, 478).

At step 614, responsive to receiving the request to add the third remote terminal, the traffic adapter is reconfigured to transmit the third outbound baseband frames to the third virtual transmitter and receive the third inbound baseband frames from the third virtual receiver.

In some examples, the satellite communication system may implement a first network type being one of an SCPC network type, an FDMA network type, or a TDMA network type. In some examples, method 600 may further include receiving, at the management system, a request to switch to a second network type, the second network type being different than the first network type and, responsive to receiving the request to switch to a second network type, reconfiguring the traffic adapter, the first virtual transmitter, the first virtual receiver, and the second virtual receiver to implement the second network type.

In some examples, the first network type is the SCPC network type and the second network type is the FDMA network type or the TDMA network type. In such examples, reconfiguring the traffic adapter to implement the second network type may include reconfiguring the traffic adapter to transmit the first outbound baseband frames and the second outbound baseband frames to a same virtual transmitter (e.g., the first virtual transmitter upon reconfiguring the first virtual transmitter to implement the second network type).

In some examples, method 600 may further include receiving, at the management system, a request to remove the third remote terminal from the satellite communication system and, responsive to receiving the request to remove the third remote terminal, terminating the third virtual transmitter and the third virtual receiver at the compute infrastructure and reconfiguring the traffic adapter to not transmit the third outbound baseband frames to the third virtual transmitter and to not receive the third inbound baseband frames from the third virtual receiver.

Figure 7:
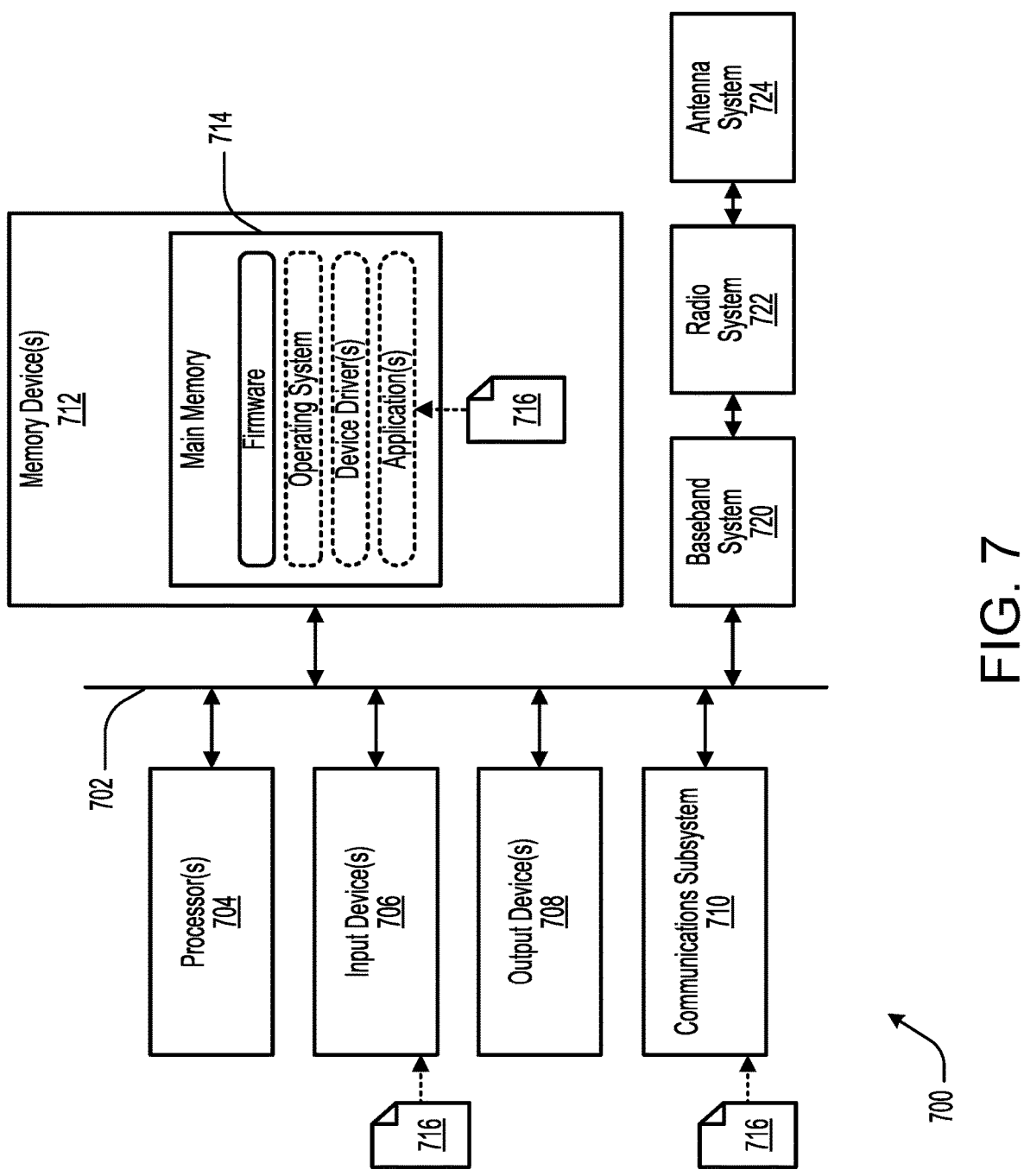
FIG. 7 illustrates an example computer system comprising various hardware elements.

FIG. 7 illustrates an example computer system 700 comprising various hardware elements, in accordance with some embodiments of the present disclosure. Computer system 700 may be incorporated into or integrated with devices described herein and/or may be configured to perform some or all of the steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

In the illustrated example, computer system 700 includes a communication medium 702, one or more processor(s) 704, one or more input device(s) 706, one or more output device(s) 708, a communications subsystem 710, one or more memory device(s) 712, a baseband system 720, a radio system 722, and an antenna system 724. Computer system 700 may be implemented using various hardware implementations and embedded system technologies. For example, one or more elements of computer system 700 may be implemented within an integrated circuit (IC), an application-specific integrated circuit (ASIC), an application-specific standard product (ASSP), a field-programmable gate array (FPGA), such as those commercially available by XILINX®, INTEL®, or LATTICE SEMICONDUCTOR®, a system-on-a-chip (SoC), a microcontroller, a printed circuit board (PCB), and/or a hybrid device, such as an SoC FPGA, among other possibilities.

The various hardware elements of computer system 700 may be communicatively coupled via communication medium 702. While communication medium 702 is illustrated as a single connection for purposes of clarity, it should be understood that communication medium 702 may include various numbers and types of communication media for transferring data between hardware elements. For example, communication medium 702 may include one or more wires (e.g., conductive traces, paths, or leads on a PCB or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 702 may include one or more buses that connect the pins of the hardware elements of computer system 700. For example, communication medium 702 may include a bus that connects processor(s) 704 with main memory 714, referred to as a system bus, and a bus that connects main memory 714 with input device(s) 706 or output device(s) 708, referred to as an expansion bus. The system bus may itself consist of several buses, including an address bus, a data bus, and a control bus. The address bus may carry a memory address from processor(s) 704 to the address bus circuitry associated with main memory 714 in order for the data bus to access and carry the data contained at the memory address back to processor(s) 704. The control bus may carry commands from processor(s) 704 and return status signals from main memory 714. Each bus may include multiple wires for carrying multiple bits of information and each bus may support serial or parallel transmission of data.

Processor(s) 704 may include one or more central processing units (CPUs), graphics processing units (GPUs), neural network processors or accelerators, digital signal processors (DSPs), and/or other general-purpose or special-purpose processors capable of executing instructions. A CPU may take the form of a microprocessor, which may be fabricated on a single IC chip of metal-oxide-semiconductor field-effect transistor (MOSFET) construction. Processor(s) 704 may include one or more multi-core processors, in which each core may read and execute program instructions concurrently with the other cores, increasing speed for programs that support multithreading.

Input device(s) 706 may include one or more of various user input devices such as a mouse, a keyboard, a microphone, as well as various sensor input devices, such as an image capture device, a temperature sensor (e.g., thermometer, thermocouple, thermistor), a pressure sensor (e.g., barometer, tactile sensor), a movement sensor (e.g., accelerometer, gyroscope, tilt sensor), a light sensor (e.g., photodiode, photodetector, charge-coupled device), and/or the like. Input device(s) 706 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 708 may include one or more of various devices that convert information into human-readable form, such as without limitation a display device, a speaker, a printer, a haptic or tactile device, and/or the like. Output device(s) 708 may also include devices for writing to removable storage devices or other removable media, such as those described in reference to input device(s) 706. Output device(s) 708 may also include various actuators for causing physical movement of one or more components. Such actuators may be hydraulic, pneumatic, electric, and may be controlled using control signals generated by computer system 700.

Communications subsystem 710 may include hardware components for connecting computer system 700 to systems or devices that are located external to computer system 700, such as over a computer network. In various embodiments, communications subsystem 710 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 712 may include the various data storage devices of computer system 700. For example, memory device(s) 712 may include various types of computer memory with various response times and capacities, from faster response times and lower capacity memory, such as processor registers and caches (e.g., L0, L1, L2), to medium response time and medium capacity memory, such as random-access memory (RAM), to lower response times and lower capacity memory, such as solid-state drives and hard drive disks. While processor(s) 704 and memory device(s) 712 are illustrated as being separate elements, it should be understood that processor(s) 704 may include varying levels of on-processor memory, such as processor registers and caches that may be utilized by a single processor or shared between multiple processors.

Memory device(s) 712 may include main memory 714, which may be directly accessible by processor(s) 704 via the address and data buses of communication medium 702. For example, processor(s) 704 may continuously read and execute instructions stored in main memory 714. As such, various software elements may be loaded into main memory 714 to be read and executed by processor(s) 704 as illustrated in FIG. 7. Typically, main memory 714 is volatile memory, which loses all data when power is turned off and accordingly needs power to preserve stored data. Main memory 714 may further include a small portion of non-volatile memory containing software (e.g., firmware, such as BIOS) that is used for reading other software stored in memory device(s) 712 into main memory 714. In some embodiments, the volatile memory of main memory 714 is implemented as RAM, such as dynamic random-access memory (DRAM), and the non-volatile memory of main memory 714 is implemented as read-only memory (ROM), such as flash memory, erasable programmable read-only memory (EPROM), or electrically erasable programmable read-only memory (EEPROM).

Computer system 700 may include software elements, shown as being currently located within main memory 714, which may include an operating system, device driver(s), firmware, compilers, and/or other code, such as one or more application programs, which may include computer programs provided by various embodiments of the present disclosure. Merely by way of example, one or more steps described with respect to any methods discussed above, may be implemented as instructions 716, which are executable by computer system 700. In one example, such instructions 716 may be received by computer system 700 using communications subsystem 710 (e.g., via a wireless or wired signal that carries instructions 716), carried by communication medium 702 to memory device(s) 712, stored within memory device(s) 712, read into main memory 714, and executed by processor(s) 704 to perform one or more steps of the described methods. In another example, instructions 716 may be received by computer system 700 using input device(s) 706 (e.g., via a reader for removable media), carried by communication medium 702 to memory device(s) 712, stored within memory device(s) 712, read into main memory 714, and executed by processor(s) 704 to perform one or more steps of the described methods.

Computer system 700 may include optional wireless communication components that facilitate wireless communication over a voice network and/or a data network. The wireless communication components comprise an antenna system 724, a radio system 722, and a baseband system 720. In computer system 700, RF signals are transmitted and received over the air by antenna system 724 under the management of radio system 722. In an embodiment, antenna system 724 may comprise one or more antennae and one or more multiplexors (not shown) that perform a switching function to provide antenna system 724 with transmit and receive signal paths. In the reception path, received RF signals can be coupled from a multiplexor to a low noise amplifier (not shown) that amplifies the received RF signal and sends the amplified signal to radio system 722. In an alternative embodiment, radio system 722 may comprise one or more radios that are configured to communicate over various frequencies. In an embodiment, radio system 722 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 722 to baseband system 720.

In some embodiments of the present disclosure, instructions 716 are stored on a computer-readable storage medium (or simply computer-readable medium). Such a computer-readable medium may be non-transitory and may therefore be referred to as a non-transitory computer-readable medium. In some cases, the non-transitory computer-readable medium may be incorporated within computer system 700. For example, the non-transitory computer-readable medium may be one of memory device(s) 712 (as shown in FIG. 7). In some cases, the non-transitory computer-readable medium may be separate from computer system 700. In one example, the non-transitory computer-readable medium may be a removable medium provided to input device(s) 706 (as shown in FIG. 7), such as those described in reference to input device(s) 706, with instructions 716 being read into computer system 700 by input device(s) 706. In another example, the non-transitory computer-readable medium may be a component of a remote electronic device, such as a mobile phone, that may wirelessly transmit a data signal that
carries instructions 716 to computer system 700 and that is
received by communications subsystem 710 (as shown in
FIG. 7).

Instructions 716 may take any suitable form to be read
and/or executed by computer system 700. For example,
instructions 716 may be source code (written in a human-
readable programming language such as Java, C, C++, C#,
Python), object code, assembly language, machine code,
microcode, executable code, and/or the like. In one example,
instructions 716 are provided to computer system 700 in the
form of source code, and a compiler is used to translate
instructions 716 from source code to machine code, which
may then be read into main memory 714 for execution by
processor(s) 704. As another example, instructions 716 are
provided to computer system 700 in the form of an execut-
able file with machine code that may immediately be read
into main memory 714 for execution by processor(s) 704. In
various examples, instructions 716 may be provided to
computer system 700 in encrypted or unencrypted form,
compressed or uncompressed form, as an installation pack-
age or an initialization for a broader software deployment,
among other possibilities.

In one aspect of the present disclosure, a system (e.g.,
computer system 700) is provided to perform methods in
accordance with various embodiments of the present disclo-
sure. For example, some embodiments may include a system
comprising one or more processors (e.g., processor(s) 704)
that are communicatively coupled to a non-transitory com-
puter-readable medium (e.g., memory device(s) 712 or main
memory 714). The non-transitory computer-readable
medium may have instructions (e.g., instructions 716) stored
therein that, when executed by the one or more processors,
cause the one or more processors to perform the methods
described in the various embodiments.

In another aspect of the present disclosure, a computer-
program product that includes instructions (e.g., instructions
716) is provided to perform methods in accordance with
various embodiments of the present disclosure. The com-
puter-program product may be tangibly embodied in a
non-transitory computer-readable medium (e.g., memory
device(s) 712 or main memory 714). The instructions may
be configured to cause one or more processors (e.g., pro-
cessor(s) 704) to perform the methods described in the
various embodiments.

In another aspect of the present disclosure, a non-transi-
tory computer-readable medium (e.g., memory device(s)
712 or main memory 714) is provided. The non-transitory
computer-readable medium may have instructions (e.g.,
instructions 716) stored therein that, when executed by one
or more processors (e.g., processor(s) 704), cause the one or
more processors to perform the methods described in the
various embodiments.

The methods, systems, and devices discussed above are
examples. Various configurations may omit, substitute, or
add various procedures or components as appropriate. For
instance, in alternative configurations, the methods may be
performed in an order different from that described, and/or
various stages may be added, omitted, and/or combined.
Also, features described with respect to certain configura-
tions may be combined in various other configurations.
Different aspects and elements of the configurations may be
combined in a similar manner. Also, technology evolves
and, thus, many of the elements are examples and do not
limit the scope of the disclosure or claims.

Specific details are given in the description to provide a
thorough understanding of exemplary configurations including implementations. However, configurations may be prac-
ticed without these specific details. For example, well-
known circuits, processes, algorithms, structures, and
techniques have been shown without unnecessary detail in
order to avoid obscuring the configurations. This description
provides example configurations only, and does not limit the
scope, applicability, or configurations of the claims. Rather,
the preceding description of the configurations will provide
those skilled in the art with an enabling description for
implementing described techniques. Various changes may
be made in the function and arrangement of elements
without departing from the spirit or scope of the disclosure.

Having described several example configurations, various
modifications, alternative constructions, and equivalents
may be used without departing from the spirit of the dis-
closure. For example, the above elements may be compo-
nents of a larger system, wherein other rules may take
precedence over or otherwise modify the application of the
technology. Also, a number of steps may be undertaken
before, during, or after the above elements are considered.
Accordingly, the above description does not bind the scope
of the claims.

As used herein and in the appended claims, the singular
forms "a", "an", and "the" include plural references unless
the context clearly dictates otherwise. Thus, for example,
reference to "a user" includes reference to one or more of
such users, and reference to "a processor" includes reference
to one or more processors and equivalents thereof known to
those skilled in the art, and so forth.

Also, the words "comprise," "comprising," "contains,"
"containing," "include," "including," and "includes," when
used in this specification and in the following claims, are
intended to specify the presence of stated features, integers,
components, or steps, but they do not preclude the presence
or addition of one or more other features, integers, compo-
nents, steps, acts, or groups.

It is also understood that the examples and embodiments
described herein are for illustrative purposes only and that
various modifications or changes in light thereof will be
suggested to persons skilled in the art and are to be included
within the spirit and purview of this application and scope of
the appended claims.

What is claimed is:

1. A method of scaling a satellite communication system,
the method comprising:

running a traffic adapter, a first virtual transmitter, and a
first virtual receiver at a compute infrastructure of a
gateway, the first virtual transmitter configured to
modulate signals based on first outbound baseband
frames for transmission to a first remote terminal via a
satellite, the first virtual receiver configured to demodu-
late signals received from the first remote terminal via
the satellite to produce first inbound baseband frames,
and the traffic adapter configured to transmit the first
outbound baseband frames to the first virtual transmit-
ter and receive the first inbound baseband frames from
the first virtual receiver;

receiving, at a management system, a request to add a
second remote terminal to the satellite communication
system; and responsive to receiving the request to add the second
remote terminal:

instantiating a second virtual receiver at the compute
infrastructure of the gateway, the second virtual
receiver configured to demodulate signals received
from the second remote terminal via the satellite to
produce second inbound baseband frames; and reconfiguring the traffic adapter to receive the second inbound baseband frames from the second virtual receiver.

2. The method of claim 1, wherein the satellite communication system implements a first network type being one of a single channel per carrier (SCPC) network type, a frequency division multiple access (FDMA) network type, or a time division multiple access (TDMA) network type.

3. The method of claim 2, further comprising:
receiving, at the management system, a request to switch to a second network type, the second network type being different than the first network type; and
responsive to receiving the request to switch to a second network type:
reconfiguring the traffic adapter, the first virtual transmitter, the first virtual receiver, and the second virtual receiver to implement the second network type.

4. The method of claim 2, wherein the first network type is the SCPC network type and the second network type is the FDMA network type or the TDMA network type, and wherein reconfiguring the traffic adapter to implement the second network type includes reconfiguring the traffic adapter to transmit the first outbound baseband frames and second outbound baseband frames to a same virtual transmitter.

5. The method of claim 1, further comprising:
further responsive to receiving the request to add the second remote terminal:
instantiating a second virtual transmitter at the compute infrastructure, the second virtual transmitter configured to modulate signals based on second outbound baseband frames for transmission to the second remote terminal via the satellite; and
reconfiguring the traffic adapter to transmit the second outbound baseband frames to the second virtual transmitter.

6. The method of claim 5, further comprising:
receiving, at the management system, a request to add a third remote terminal to the satellite communication system; and
responsive to receiving the request to add the third remote terminal:
instantiating a third virtual receiver at the compute infrastructure, the third virtual receiver configured to demodulate signals received from the third remote terminal via the satellite to produce third inbound baseband frames; and
reconfiguring the traffic adapter to receive the third inbound baseband frames from the third virtual receiver.

7. The method of claim 6, further comprising:
further responsive to receiving the request to add the third remote terminal:
instantiating a third virtual transmitter at the compute infrastructure, the third virtual transmitter configured to modulate signals based on third outbound baseband frames for transmission to the third remote terminal via the satellite; and
reconfiguring the traffic adapter to transmit the third outbound baseband frames to the third virtual transmitter.

8. The method of claim 7, further comprising:
receiving, at the management system, a request to remove the third remote terminal from the satellite communication system; and responsive to receiving the request to remove the third remote terminal:
terminating the third virtual receiver at the compute infrastructure; and
reconfiguring the traffic adapter to not receive the third inbound baseband frames.

9. A non-transitory computer-readable medium comprising instructions that, when executed by one or more processors, cause the one or more processors to perform operations for scaling a satellite communication system, the operations comprising:
running a traffic adapter, a first virtual transmitter, and a first virtual receiver at a compute infrastructure of a gateway, the first virtual transmitter configured to modulate signals based on first outbound baseband frames for transmission to a first remote terminal via a satellite, the first virtual receiver configured to demodulate signals received from the first remote terminal via the satellite to produce first inbound baseband frames, and the traffic adapter configured to transmit the first outbound baseband frames to the first virtual transmitter and receive the first inbound baseband frames from the first virtual receiver;
receiving, at a management system, a request to add a second remote terminal to the satellite communication system; and
responsive to receiving the request to add the second remote terminal:
instantiating a second virtual receiver at the compute infrastructure of the gateway, the second virtual receiver configured to demodulate signals received from the second remote terminal via the satellite to produce second inbound baseband frames; and
reconfiguring the traffic adapter to receive the second inbound baseband frames from the second virtual receiver.

10. The non-transitory computer-readable medium of claim 9, wherein the satellite communication system implements a first network type being one of a single channel per carrier (SCPC) network type, a frequency division multiple access (FDMA) network type, or a time division multiple access (TDMA) network type.

11. The non-transitory computer-readable medium of claim 10, wherein the operations further comprise:
receiving, at the management system, a request to switch to a second network type, the second network type being different than the first network type; and
responsive to receiving the request to switch to a second network type:
reconfiguring the traffic adapter, the first virtual transmitter, the first virtual receiver, and the second virtual receiver to implement the second network type.

12. The non-transitory computer-readable medium of claim 10, wherein the first network type is the SCPC network type and the second network type is the FDMA network type or the TDMA network type, and wherein reconfiguring the traffic adapter to implement the second network type includes reconfiguring the traffic adapter to transmit the first outbound baseband frames and second outbound baseband frames to a same virtual transmitter.

13. The non-transitory computer-readable medium of claim 9, wherein the operations further comprise:
further responsive to receiving the request to add the second remote terminal:
instantiating a second virtual transmitter at the compute infrastructure, the second virtual transmitter configured to modulate signals based on second outbound baseband frames for transmission to the second remote terminal via the satellite; and reconfiguring the traffic adapter to transmit the second outbound baseband frames to the second virtual transmitter.

14. The non-transitory computer-readable medium of claim 13, wherein the operations further comprise:

receiving, at the management system, a request to add a third remote terminal to the satellite communication system; and responsive to receiving the request to add the third remote terminal:

instantiating a third virtual receiver at the compute infrastructure, the third virtual receiver configured to demodulate signals received from the third remote terminal via the satellite to produce third inbound baseband frames; and reconfiguring the traffic adapter to receive the third inbound baseband frames from the third virtual receiver.

15. The non-transitory computer-readable medium of claim 14, wherein the operations further comprise:

further responsive to receiving the request to add the third remote terminal:

instantiating a third virtual transmitter at the compute infrastructure, the third virtual transmitter configured to modulate signals based on third outbound baseband frames for transmission to the third remote terminal via the satellite; and reconfiguring the traffic adapter to transmit the third outbound baseband frames to the third virtual transmitter.

16. The non-transitory computer-readable medium of claim 15, wherein the operations further comprise:

receiving, at the management system, a request to remove the third remote terminal from the satellite communication system; and responsive to receiving the request to remove the third remote terminal:

terminating the third virtual receiver at the compute infrastructure; and reconfiguring the traffic adapter to not receive the third inbound baseband frames.

17. A system comprising:

one or more processors; and a computer-readable medium comprising instructions that, when executed by the one or more processors, cause the one or more processors to perform operations for scaling a satellite communication system, the operations comprising:

running a traffic adapter, a first virtual transmitter, and a first virtual receiver at a compute infrastructure of a gateway, the first virtual transmitter configured to modulate signals based on first outbound baseband frames for transmission to a first remote terminal via a satellite, the first virtual receiver configured to demodulate signals received from the first remote terminal via the satellite to produce first inbound baseband frames, and the traffic adapter configured to transmit the first outbound baseband frames to the first virtual transmitter and receive the first inbound baseband frames from the first virtual receiver;

receiving, at a management system, a request to add a second remote terminal to the satellite communication system; and responsive to receiving the request to add the second remote terminal:

instantiating a second virtual receiver at the compute infrastructure of the gateway, the second virtual receiver configured to demodulate signals received from the second remote terminal via the satellite to produce second inbound baseband frames; and reconfiguring the traffic adapter to receive the second inbound baseband frames from the second virtual receiver.

18. The system of claim 17, wherein the operations further comprise:

further responsive to receiving the request to add the second remote terminal:

instantiating a second virtual transmitter at the compute infrastructure, the second virtual transmitter configured to modulate signals based on second outbound baseband frames for transmission to the second remote terminal via the satellite; and reconfiguring the traffic adapter to transmit the second outbound baseband frames to the second virtual transmitter.

19. The system of claim 18, wherein the operations further comprise:

receiving, at the management system, a request to add a third remote terminal to the satellite communication system; and responsive to receiving the request to add the third remote terminal:

instantiating a third virtual receiver at the compute infrastructure, the third virtual receiver configured to demodulate signals received from the third remote terminal via the satellite to produce third inbound baseband frames; and reconfiguring the traffic adapter to receive the third inbound baseband frames from the third virtual receiver.

20. The system of claim 19, wherein the operations further comprise:

further responsive to receiving the request to add the third remote terminal:

instantiating a third virtual transmitter at the compute infrastructure, the third virtual transmitter configured to modulate signals based on third outbound baseband frames for transmission to the third remote terminal via the satellite; and reconfiguring the traffic adapter to transmit the third outbound baseband frames to the third virtual transmitter.

* * * * *